P. LUSTRIK.
EXTENSIBLE MICROMETER CALIPER.
APPLICATION FILED JULY 5, 1919.

1,425,027.

Patented Aug. 8, 1922.

Inventor,
Peter Lustrik
By Brockett and Hyde
Attys.

UNITED STATES PATENT OFFICE.

PETER LUSTRIK, OF CLEVELAND, OHIO.

EXTENSIBLE MICROMETER CALIPER.

1,425,027.  Specification of Letters Patent.  Patented Aug. 8, 1922.

Application filed July 5, 1919. Serial No. 308,893.

*To all whom it may concern:*

Be it known that I, PETER LUSTRIK, a citizen of the United States, residing at Cleveland, in the county of Cuyahoga and State of Ohio, have invented certain new and useful Improvements in Extensible Micrometer Calipers, of which the following is a specification.

This invention relates to micrometer calipers of the extensible type.

The object of the invention is to produce a micrometer caliper having a wide range of adjustments and utilizable throughout its full range of adjustment either for taking accurately the size of an article or for setting the caliper to any desired definite size, and in which the parts are of simple construction, can be readily assembled, can be adjusted to maintain accuracy in spite of wear, and in which lost motion or play between the caliper jaws is avoided by solid mounting of said jaws and the application of adjusting pressure thereto between the supports therefor so as to avoid cocking of the jaws on the supports.

Further objects of the invention are in part obvious and in part will appear more in detail hereinafter.

Figure 1:
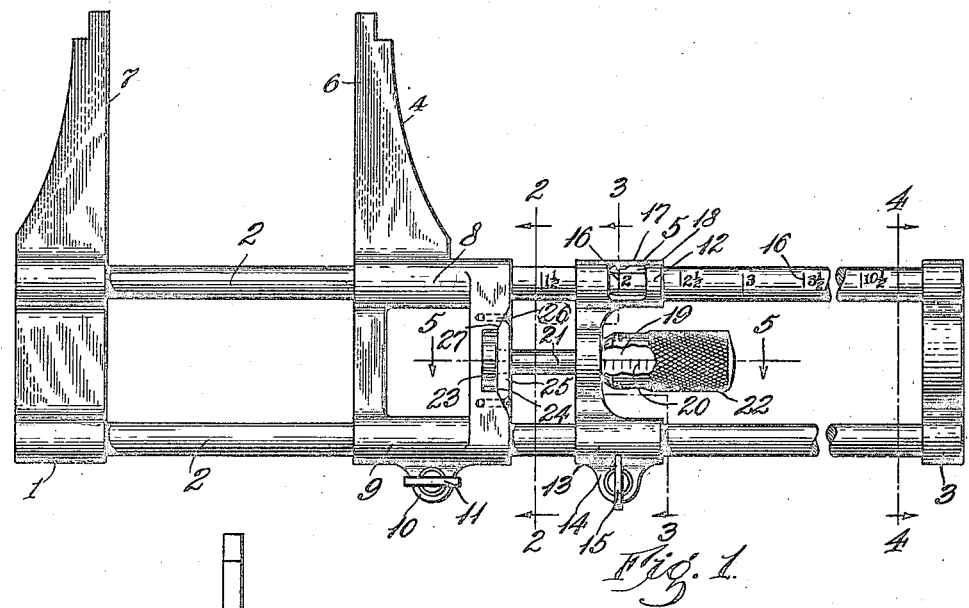
Figure 2:
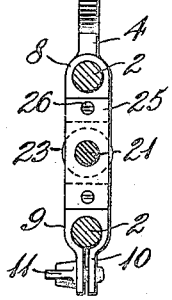
Figure 3:
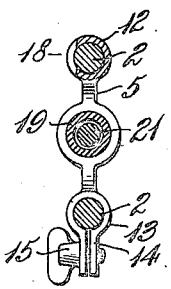
Figure 4:
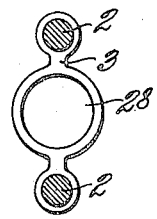
Figure 5:
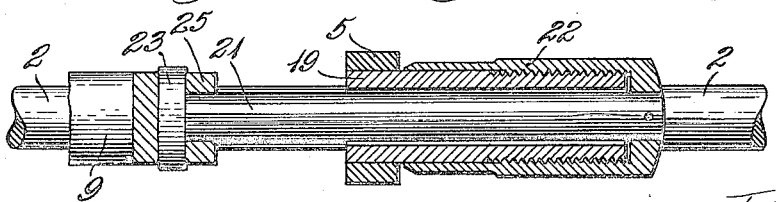

In the drawings, which represent one embodiment of the invention, Fig. 1 is a side elevation; Fig. 2 is a cross section on the line 2—2, Fig. 1; Fig. 3 is a similar view on the line 3—3, Fig. 1; Fig. 4 is a similar view on the line 4—4, Fig. 1; and Fig. 5 is a longitudinal section on the line 5—5, Fig. 1.

The calipers shown in the drawings comprise a rigid frame of suitable form including a head 1 to which are connected a pair of parallel guide bars or members 2 connected at their outer ends by a bridge 3, so as to form a substantially rectangular frame. The guide members 2 may be rods or bars of any suitable length press fitted, soldered, welded or brazed into openings in the head and bridge, as desired, and of sufficiently large size to avoid lateral bending thereof such as might interfere with the accuracy of the device or free slide of the slide members thereon.

On the guide bars 2 are mounted a pair of slides 4, 5, which of course are placed on said guide bars before the frame is completely assembled. Slide 4 is next adjacent to the head 1 and has an outwardly extending jaw portion 6 cooperating with a like jaw portion 7 of the head, and between which jaw portions the work to be calipered is inserted, as is usual. Said slide also has a sleeve portion 8 surrounding one of the rods 2, and a second sleeve portion 9 surrounding the other rod 2, said latter sleeve being split and provided with clamping ears 10 to receive the clamping screw 11. By turning up this screw the slide 4 may be locked in any position along the rods to which it may be adjusted.

Slide 5 has a sleeve 12 sliding on one jaw 2 and a split sleeve portion 13 sliding on the other rod 2 and provided with ears 14 and a clamping screw 15. One of the sleeve portions of the slide 5 may be provided with a suitable indicating member co-operating with a series of indicating marks 16 spaced at intervals along one of the rods 2. This indicating device may be a pointer or an index mark 17 on the sleeve 12 lying at one edge of a sight opening 18 in the sleeve through which marks 16 are visible.

The two slides 4 and 5 are connected by micrometer mechanism of ordinary form. Said mechanism includes a body portion 19 solidly secured to the slide 5. This body portion is of sleeve form and may be secured to the slide 5 by being press fitted to an opening therein. Body 19 has the usual indicating marks 20 distributed along its length and is externally threaded to receive the threads of a barrel member 22 surrounding the body 19 and connected to a rod 21. Rod 21 turns with the rotating barrel and extends through the sleeve 19 to the slide 4 where it is provided with a head 23 swiveled or rotatably connected to said slide. As illustrated the head 23 turns in a slot or opening 24 between the body of the slide 4 and a plate 25 connected thereto by screws 26. The ends of said plate are cut off on an angle, as at 27.

Bridge member 3 may have an opening 28 in its central portion through which the barrel 22 of the micrometer mechanism may extend, so as to enable the slide 5 to be brought closer to the bridge than would otherwise be the case.

The caliper is used as follows: Let us assume that the micrometer mechanism has a capacity or is adjustable through a range of one-half inch. In this case the indicating marks 16 on the rod 2 are located one-half 110 inch apart along the length of said rod. To set the caliper to any given dimensions, say two inches, both clamping screws 11, 15 are loosened, the micrometer mechanism is set at zero and slide 5 is adjusted until its indicating mark 17 registers with the two inch mark on the rod 2. Clamping screws 11 and 15 are then tightened to hold both slides in adjusted position. By rotating the barrel 22 any additional amount over two inches may be added to the two inches already secured, according to the proper adjustment of the micrometer barrel. Adjustment of said barrel with the slide 5 fixed will move the slide 4 to the right in Fig. 1.

If the size of a given article is to be determined the micrometer is set at zero, both clamping screws are loosened and the jaws 6, 7 set to embrace the article to be measured. Clamping screw 11 is then turned up to fix the jaw 4 in position. Indicating mark 17 will then lie between two of the marks 16 upon the rod 2, and by turning the micrometer barrel to move the slide 5 until its indicating mark 17 registers with the next mark 16 of lower value the additional amount above said lower value can be read on the micrometer device.

The pressure of the micrometer mechanism in adjusting the two slides relative to each other is transmitted to said slides midway between their supports on the guide rods, so that there is no tendency of the slides to stick on the guide rods or to become cocked or tilted thereon as is the case when the micrometer mechanism is at one side of the guides.

The construction also insures accuracy since the device is adjustable to do away with lost motion between the swivel head of the micrometer device and the slide 4. Between said head and the slide 4 there should be no lost motion longitudinally of the mechanism, and such lost motion can be avoided even if wear occurs by taking off the plate 25 and lapping off or grinding its beveled ends 27 to adjust it into closer contact with the head 23.

What I claim is:

1. An extensible micrometer caliper, comprising a rigid frame including two parallel guide members, a bridge permanently connecting said members at one end, a stationary jaw permanently connecting said members at the other end, a pair of slides movable on said guide members and permanently retained thereon by said bridge and jaw, one of said slides having a jaw for co-operation with said stationary jaw and lying between said stationary jaw and the other slide, and micrometer adjusting mechanism connecting said slides and lying between said guide members.

2. An extensible micrometer caliper, comprising a rigid frame including two parallel guide members and a stationary jaw, a pair of slides movable on said guide members, one thereof having a jaw, and micrometer mechanism lying between said guide members, said mechanism including a body rigidly secured to one slide, an adjustable barrel member cooperating therewith and having a rod extending to the other slide, and a head on said rod rotatably connected to the other slide.

3. An extensible micrometer caliper, comprising a rigid frame including two parallel guide members and a stationary jaw, a pair of slides movable on said guide members, one thereof having a jaw, and micrometer mechanism lying between said guide members said mechanism including a body rigidly secured to one slide, an adjustable barrel member cooperating therewith and having a rod extending to the other slide, a head on said rod lying in a recess of the other slide, and a removable plate securing said head rotatably in said recess.

4. An extensible micrometer caliper, comprising a rigid frame including two parallel guide members and a stationary jaw, a pair of slides movable on said guide members, one thereof having a jaw, and micrometer mechanism lying between said guide members, said mechanism including a body rigidly secured to one slide, an adjustable barrel member cooperating therewith and having a rod extending to the other slide, a head on said rod lying in a recess of the other slide, and a removable plate securing said head rotatably in said recess, said plate having beveled end portions.

5. An extensible micrometer caliper, comprising a pair of parallel guide members rigidly connected at one end by a head having a jaw portion and at the other end by a bridge having a central opening, a pair of slides movable on said guide members, one of which has a jaw portion, and micrometer mechanism connecting said slides and lying between said guide members, the barrel thereof extending toward said bridge and being movable through the opening thereof.

In testimony whereof I affix my signature.

PETER LUSTRIK.